June 9, 1942. M. H. EMMER 2,285,698
COFFEE BOTTLE SUPPORTING PLATE AND HANDLE
Filed Aug. 24, 1940
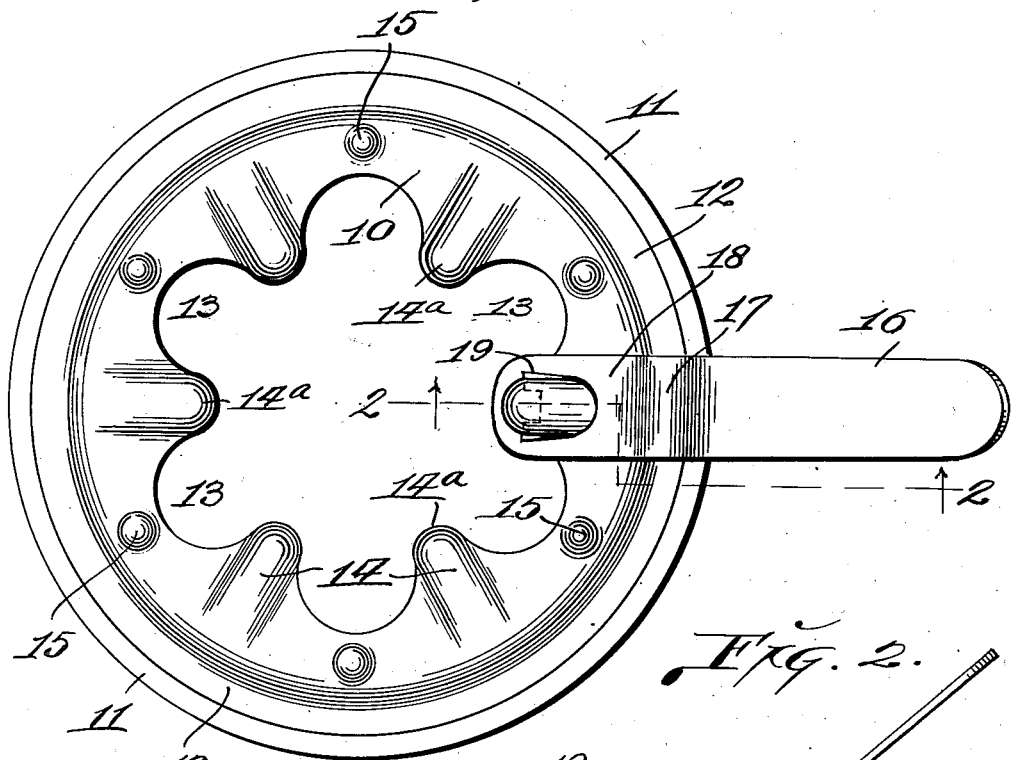
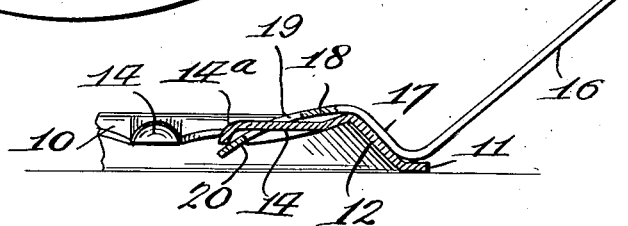
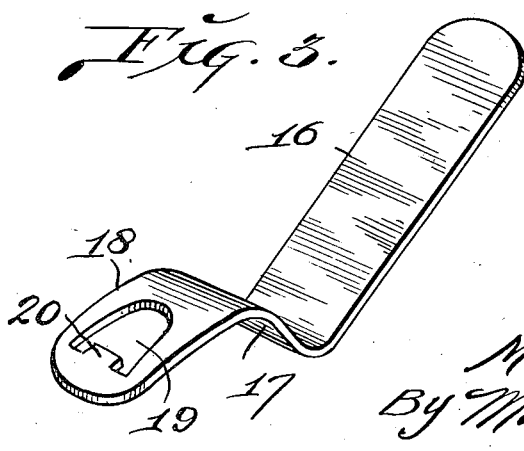
INVENTOR:
MIKE H. EMMER.
By Martin ?. Smith, ATTY.

Patented June 9, 1942

2,285,698

UNITED STATES PATENT OFFICE 2,285,698

COFFEE BOTTLE SUPPORTING PLATE AND HANDLE

Mike H. Emmer, Los Angeles, Calif.

Application August 24, 1940, Serial No. 354,059

1 Claim. (Cl. 126—215)

My invention relates generally to culinary utensils and more particularly to a plate for supporting the glass bottles or decanters that are now generally used in households, restaurants, lunch rooms, and the like, for making and holding coffee.

It will be understood that a widely practiced method of making coffee involves the use of a glass bottle or decanter which is filled with water and placed over a gas flame or other source of heat and when the water has become heated to the desired degree, the depending spout of a coffee container is inserted through the neck of the bottle.

During the coffee making process the heated water passes from the bottle or decanter upwardly into the coffee receptacle and as a result, the apparatus becomes top heavy with resulting tendency to tilt and in some instances to tip over.

It is the principal object of my invention to provide a relatively simple, practical, and inexpensive plate particularly adapted for receiving and firmly supporting the glass bottle or decanter of a coffee making apparatus, which plate is constructed so that the heat from the gas flame or other source is uniformly distributed against and around the lower portion of the bottle or decanter, said plate being formed so that the bottom of the bottle rests on a horizontally disposed support comprising a plurality of spaced lugs or projections formed on the plate and projecting slightly above the surface thereof so as to permit uniform flow of heat outwardly and upwardly over the surface of the lower portion of the bottle.

A further object of my invention is, to construct the supporting plate with a series of upwardly projecting lugs disposed so as to engage the under surface of the bottle and maintain the same in central position upon the plate and counteracting any tendency of the bottle to shift radially in any direction after having been properly positioned upon the plate, and the joint effect produced by the two sets of lugs counteracting any tendency of the coffee making apparatus to tilt and upset as a result of top-heaviness.

A further object of my invention is, to provide a simple and practical handle constructed so that it may be detachably applied to the plate for the lifting and handling of the same while said plate is in a heated condition. Thus after the plate has been positioned on a stove or other heating appliance for supporting the coffee making apparatus, said plate may be conveniently engaged, lifted and placed on a table, counter, or other support, so as to hold the bottle or decanter while the same is in service.

With the foregoing and other objects in view, my invention consists in certain novel features of construction and arrangement of parts that will be hereinafter more fully described and claimed and illustrated in the accompanying drawing in which:

Fig. 1 is a top plan view of a coffee bottle supporting plate and handle constructed in accordance with my invention.

Fig. 2 is a vertical section taken on the line 2—2 of Fig. 1.

Fig. 3 is a perspective view of the handle used for lifting and manipulating the plate.

Referring by numerals to the accompanying drawing which illustrates a preferred embodiment of my invention, 10 designates a circular plate which may be either cast or pressed from sheet metal, said plate being in the form of a disc and having a flat horizontally disposed marginal base flange 11 that is adapted to rest on the grid above the burner or heating element of a stove or the like. Extending upwardly and inwardly from the inner edge of the marginal flange is an inclined wall 12 and that portion of the plate encompassed by said wall is slightly dished or made concave in cross section. The center of the dished portion of the plate is cut away to form an opening of substantial size, said opening having substantially semi-circular portions 13 that extend outwardly toward the top of the inclined wall 12.

These outwardly projecting portions of the opening are spaced equal distances apart and portions of the metal forming the plate between the portions 13 of the central opening are pressed upwardly to form radially disposed ribs 14, the outer ends of which blend into the concave surface of plate 10 adjacent the upper end of wall 12.

Inasmuch as the metal forming the plate is pressed upwardly to form the ribs 14, the latter are provided on their under faces with recesses, the same being clearly shown in Fig. 2.

The metal forming the plate is curved downwardly at the forward ends of said ribs and said downwardly curved inner ends are rounded as designated by 14a.

These radially disposed ribs combine to form a horizontally disposed support for the rounded under side of a coffee bottle and in order to maintain the bottle in central position upon the plate, portions of the metal forming the plate just beyond the outer ends of the extensions 13 of the central opening are pressed upwardly to form lugs 15. These lugs in addition to serving to center the bottle or decanter upon the plate provide shoulders that engage the outer portion of the wall of the bottle immediately above the bottom thereof, thus effectively holding said bottle against radial or lateral shifting or sliding movement when said bottle is properly positioned on the plate.

The radially disposed ribs 14 support the under surface of the bottle a slight distance above the concave upper surface of the central portion 10 of the plate, thus enabling heated air to flow from the opening in the plate upwardly around the lower portion of the bottle so as to uniformly heat same.

The handle utilized for lifting and shifting the plate from one position to another is formed from a single piece of metal, preferably four or five inches in length and approximately an inch in width, and the main portion 16 of this piece of metal is straight so as to be conveniently grasped in the hand.

A portion of the metal forming the handle near the forward end thereof is extended upwardly substantially at right angles so as to form a short member 17 which, when the handle is applied to the plate, overlies a portion of the outer face of the inclined wall 12, and that portion 18 of the metal beyond the portion 17 is curved slightly lengthwise so that when the handle is properly applied to the plate as illustrated in Figs. 1 and 2, said curved portion will overlie one of the radial ribs 14 and portions of the plate 10 immediately to the sides of said rib.

Formed in the curved portion 18 of the handle is an aperture 19 that gradually increases in width toward its forward end, which aperture is for the accommodation of the ends of the ribs that project into the opening in the center of the plate, and in order that the handle may firmly retain its engagement with the rib to which it is applied, a short tongue 20 projects from the forward portion of the handle into the forward portion of aperture 19.

Thus when the handle is applied to one of the ribs 14 of the plate, the projecting end of said rib extends through opening 19, one end of the handle positioned beneath the end of said rib and with the tongue 20 projecting upwardly into the recess in the underface of said rib.

When the handle is properly applied to the plate for the purpose of lifting and shifting the same from one position to another, the inclined portion 17 of the handle rests on the outer face of the inclined wall 12 and the main portion 16 of the handle projects upwardly at an angle of approximately forty-five degrees relative to the horizontal and thus, when said handle is grasped in the hand the knuckles do not make contact with the surface on which the plate rests and consequently the knuckles and hand can not be burned.

The construction of the handle is such that it may be easily and quickly applied to or removed from the plate and provides convenient means for lifting and moving the plate from one position to another while the same is in a heated condition or while being placed over a flame.

My improved plate functions to maintain a coffee bottle or decanter in proper upright position so that heated air from the flame or heating element below the plate flows upwardly all around the bottle or decanter so as to uniformly heat the same and its contents.

Where bottles are improperly positioned over the flame or heater so that the heated air from the flame does not flow uniformly upwardly around the bottle, there is always one side of the bottle that is considerably cooler than the other side and which condition causes uneven expansion and contraction of the glass so as to weaken the same, thereby tending to increase the possibility of breakage of the bottle.

Further, where the bottle is improperly positioned over a flame, such condition results in a permanent staining of the bottle due to deposits of carbon and the like, and such condition is eliminated by the use of my improved plate.

Further, the use of the plate for the proper support of the bottle eliminates the possibility of burning of the wood or composition handle of the bottle during the coffee making process.

Combined plates and handles constructed in accordance with my invention have been used in households, restaurants, cafes, and the like, with entire satisfaction, and an increasing demand for the plates by the public proves that the invention is entirely practical and meets with public favor.

Thus it will be seen that I have provided a coffee bottle supporting plate and handle that is relatively simple in construction, inexpensive of manufacture and very effective in performing the functions for which it is intended.

It will be understood that minor changes in the size, form and construction of the various parts of my improved coffee bottle supporting plate and handle, may be made and substituted for those herein shown and described, without departing from the spirit of my invention, the scope of which is set forth in the appended claim.

I claim as my invention:

In a coffee bottle supporting device the combination of a plate having adjacent its marginal edge an upwardly projecting, inwardly inclined, circumferential wall, that portion of the plate encompassed by said wall being concave and provided with a central opening, the edge of which is shaped to provide alternately arranged, outwardly projecting notches, and radially disposed inwardly projecting ribs, the latter being provided on their under sides with recesses, rounded studs projecting upwardly from the upper face of the concave portion of the plate outwardly from the notches therein, and a handle provided in one end with an opening for the reception of the forward ends of said inwardly projecting ribs, said handle having a lug projecting rearwardly from the forward end of said opening for engagement in the recesses in the under faces of said ribs and having an inclined portion outwardly from said opening for engagement with the outer face of the inclined wall of the plate when the handle is applied thereto.

MIKE H. EMMER.